Nov. 11, 1924.

E. McINTOSH 1,514,710

INTERNAL COMBUSTION ENGINE

Filed Dec. 22, 1922   4 Sheets-Sheet 1

Inventor

E. McIntosh

By D. Swift

Attorney

Nov. 11, 1924.
E. McINTOSH
1,514,710
INTERNAL COMBUSTION ENGINE
Filed Dec. 22, 1922
4 Sheets-Sheet 2

Inventor
E. McIntosh
By D. Shaft
Attorney

Nov. 11, 1924.

E. McINTOSH 1,514,710

INTERNAL COMBUSTION ENGINE

Filed Dec. 22, 1922

Inventor
E. McIntosh
By D. Swift
Attorney

Nov. 11, 1924.  
E. McINTOSH  
1,514,710  
INTERNAL COMBUSTION ENGINE  
Filed Dec. 22, 1922   4 Sheets-Sheet 4
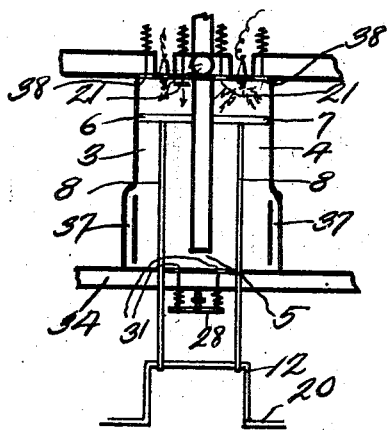
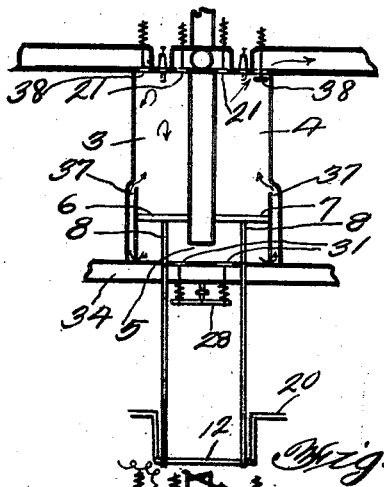
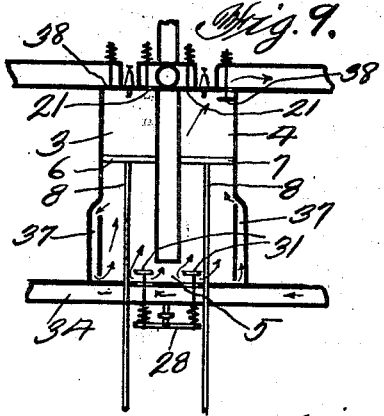
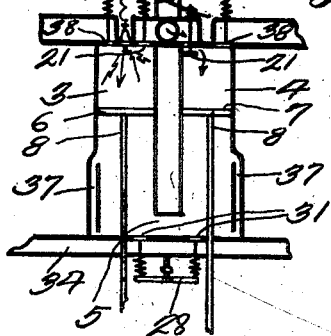
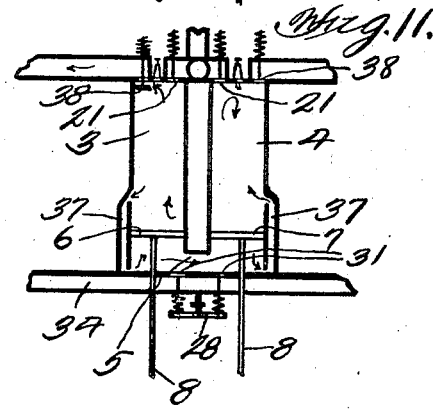
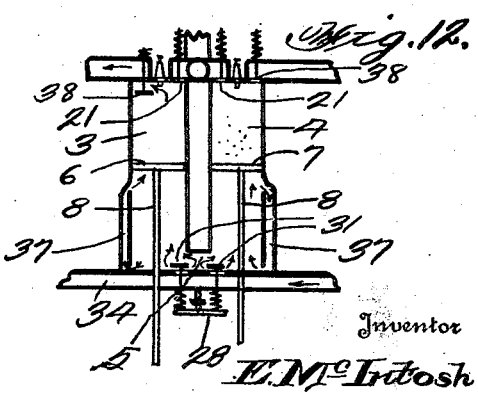
Inventor  
E. McIntosh  
By  
Attorney Patented Nov. 11, 1924.

1,514,710

UNITED STATES PATENT OFFICE.

EMANUEL McINTOSH, OF ANN ARBOR, MICHIGAN.

INTERNAL-COMBUSTION ENGINE.

Application filed December 22, 1922. Serial No. 608,465.

*To all whom it may concern:*

Be it known that I, EMANUEL McINTOSH, a citizen of the United States, residing at Ann Arbor, in the county of Washtenaw, State of Michigan, have invented a new and useful Internal-Combustion Engine; and I do hereby declare the following to be a full, clear, and exact description of the invention, such as will enable others skilled in the art to which it appertains to make and use the same.

The invention relates to internal combustion engines and has for its object to provide a device of this character which is light in construction, economic in consumption of fuel, positive in its operation, provided with balanced pistons, thereby reducing vibrations to a minimum, and constructed in such a manner that the pistons will not have side play.

A further object is to provide an internal combustion engine comprising parallel cylinders, in which cylinders pistons are slidably mounted. The lower ends of the cylinders are in communication with each other adjacent air intake ports controlled by valves and ports in the sides of the walls of the cylinders whereby the pistons after compressing the air sucked in below the same will transfer the compressed air to a position above the piston thereby volatilizing the charge in the intaking cylinder. The compressed air below the firing cylinder being held against transfer above the piston by the expanded gases until the gases are exhausted.

A further object to provide a Y-shaped air valve actuating lever for each pair of cylinders, said lever having one of its arms disposed in cooperative relation to a cam carried by the cam shaft of the engine.

A further object is to provide spring closed air valves in the bottoms of the cylinders, said valves being wedge shaped thereby allowing easy flow of air into the cylinders below the pistons on their upward strokes.

A further object is to provide the pistons with piston rods, which rods reciprocate axially, thereby obviating side play of the piston and consequently obviating wear on the cylinder at opposite sides thereof as in the case where a connecting rod is used.

A further object is to provide the lower end of piston rod with a horizontally and transversely disposed yoke slidably mounted on vertical guides in the engine casing, said yoke engaging cranks carried by a crank shaft and rotating the crank upon vertical reciprocation of the yokes.

A further object is to provide the cranks of the crank shaft with bearing blocks, which blocks are slidably mounted in the yoke.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 7 is a diagrammatic view showing the pistons intaking on number one cylinder and firing on number two.

Figure 8 is a diagrammatic view showing the piston of number one cylinder at the end of the intake stroke and the piston of number two cylinder at the end of the explosion stroke.

Figure 9 is a diagrammatic view showing number one piston under compression stroke and number two on the exhaust.

Figure 10 is a diagrammatic view showing number one piston on the firing stroke and number two on the intaking stroke.

Figure 11 is a diagrammatic view showing number one and number two pistons starting the exhaust and compression strokes respectively.

Figure 12 is a diagrammatic view showing number one piston on its upward exhaust stroke and number two piston compressing a charge, said pistons also sucking in air beneath the same.

Figure 1:
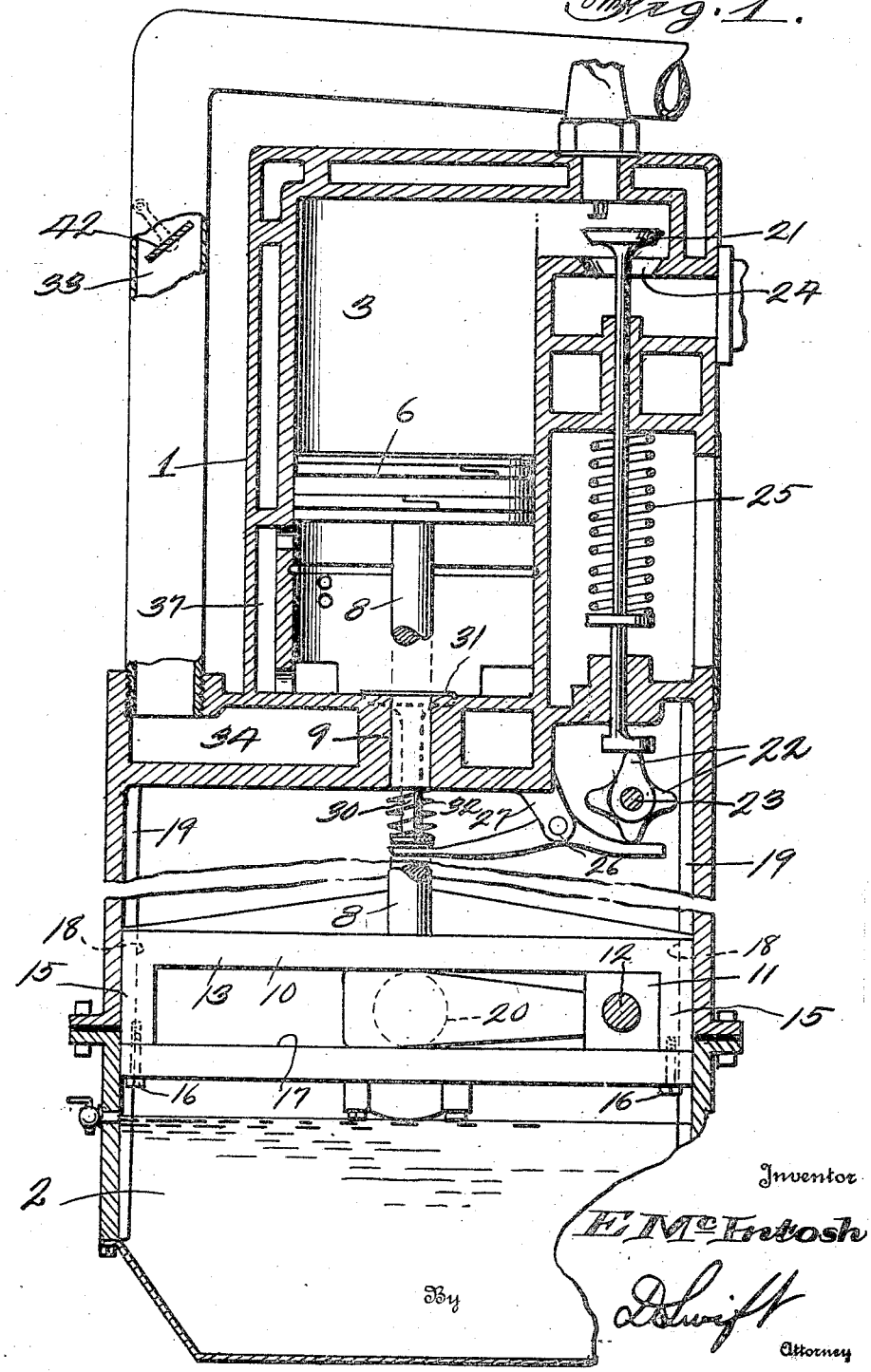
Figure 1 is a vertical transverse sectional view through the engine showing the same on an intake stroke.
Figure 2:
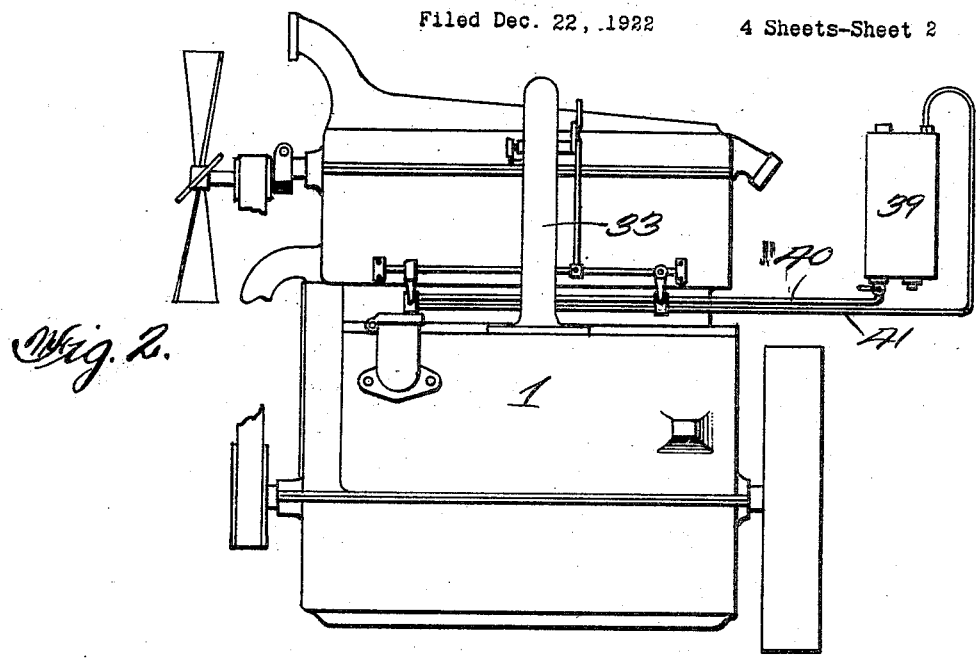
Figure 2 is a side elevation of the engine.
Figure 3:
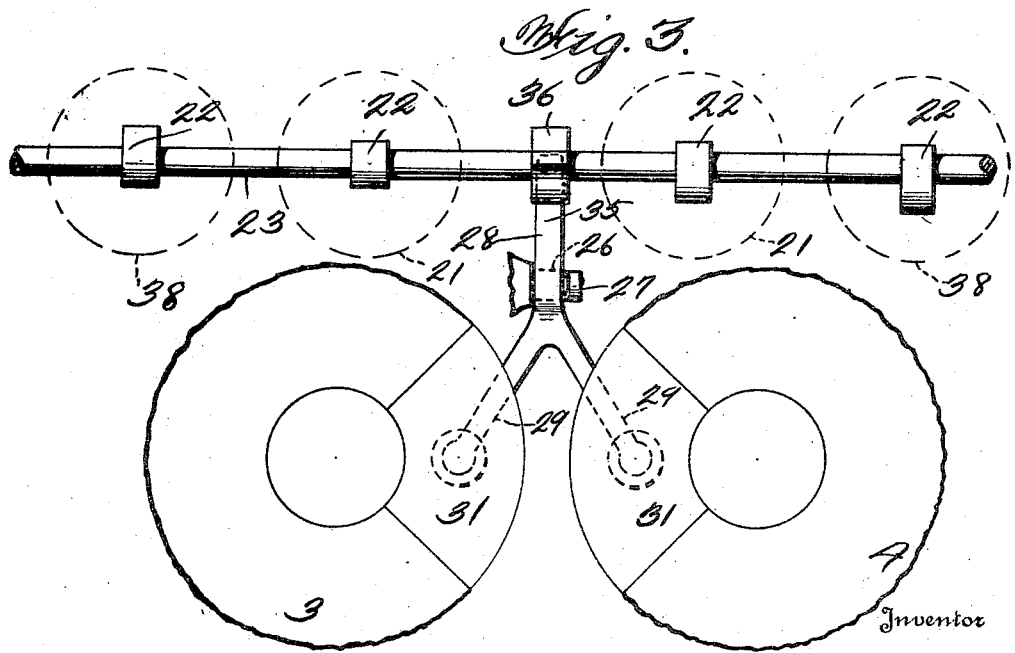
Figure 3 is a top plan view of the cam shaft and the air valve operating mechanism.
Figure 4:
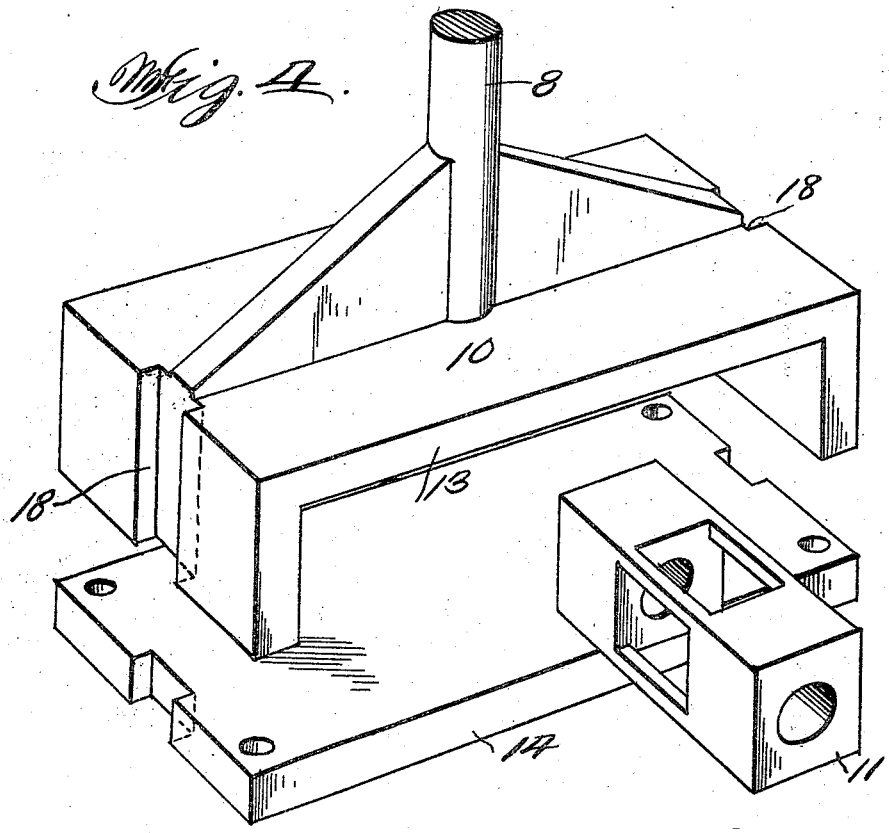
Figure 4 is a detail collective perspective view of the crank yoke.
Figure 5:
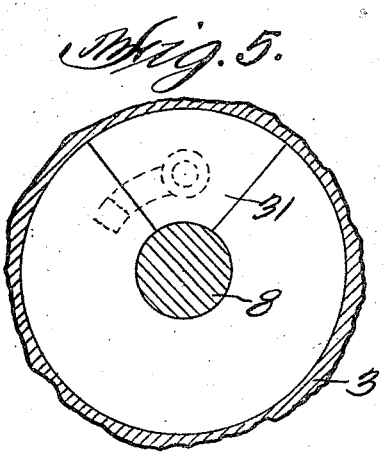
Figure 5 is a horizontal sectional view through the lower portion of one of the cylinders, showing an air valve in the bottom thereof, said air valve being wedge shaped and extending to a point where it will form one side of the bearing for the piston rod.

Referring to the drawings, the numeral 1 designates the engine casing, which casing is provided with a crank pit 2 and with spaced cylinders 3 and 4, which cylinders adjacent their lower ends are provided with passages for air communication 5, the purpose of which will hereinafter be described. Slidably mounted in the cylinders 3 and 4 are pistons 6 and 7, which pistons, may be of any form, however a conventional form of steam piston as shown in Figure 1 may be used. Heretofore in internal combustion engine connecting rods have been used, which connecting rods move in a vertical transverse plane and consequently cause wear on the cylinders at opposite sides thereof, thereby causing what is known as side slap. To obviate this difficulty the pistons 6 and 7 are provided with vertically disposed piston rods 8, which rods as well as the pistons 6 and 7 simultaneously move in the same direction. The lower ends of the piston rods 8 are slidably mounted in bearings 9 in the bottoms of the cylinders 3 and 4 and have their extreme lower ends provided with transversely disposed crank receiving yokes 10 in which bearings blocks 11 are slidably mounted, said bearing blocks being carried by the cranks 12. Each yoke 10 comprising a U-shaped member 13 carried by the piston rod 8 and a removable plate 14, which plate is secured to the downwardly extending arms 15 of the U-shaped member by means of bolts 16, thereby forming a transverse and horizontally disposed guide 17 for the bearing block 11. The yoke 10 has its ends provided with guide channels 18, which channels receive vertically disposed guide ribs 19 carried by the inner walls of the engine casing. It will be seen that when the pistons are reciprocated that the crank shaft 20 will be rotated by the yoke 10 which cooperates with the cranks 12.

Figure 6:
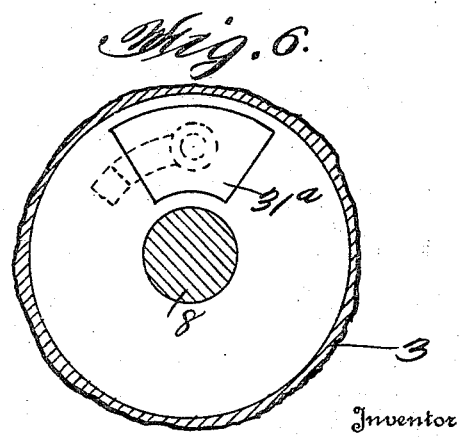
Figure 6 is a horizontal sectional view through the lower portion of one of the cylinders showing a modified form of air valve which air valve is segmentally shaped and does not extend to the piston rod.

Each cylinder is provided with an intake valve 21, which valves are controlled by cams 22 carried by a conventional form of cam shaft 23. The valves 21 cooperate with intake ports 24 and are normally held in closed position by means of coiled springs 25. The cam shaft may be driven in any suitable manner, however it is preferably driven from crank shaft 20 and at one half the speed of the crank shaft 20. Pivotally connected at 26 to bracket 27 disposed between each pair of cylinders 3 and 4 is a Y-shaped lever 28. The diverging arms 29 of the lever 28 extend beneath the adjacent sides of the cylinders 3 and 4 and underlie valve stems 30 of air controlled valves 31 in the bottom of each cylinder 3 and 4, which valves 31 upon the upward simultaneous movement of the pistons 6 and 7 are unseated against the action of the springs 32, thereby allowing air to be sucked into the cylinders below the pistons through the air supply pipe 33 and chamber 34 beneath the cylinders. However to insure the positive operation of the valves 31, the arm 35 of the Y-shaped lever 28 underlies a cam 36 carried by the cam shaft 23, which cam 36 during the rotation of the cam shaft rocks the lever 28 on its pivotal point 26 and consequently moves the arms 28 simultaneously upwardly thereby unseating the valves 31. The valves 31 are preferably segmentally shaped and form one side of the bearing 9 for the piston rod 8, thereby allowing a greater area through the ports through which air is sucked. If so desired the valves 31 may be shaped as shown at 31 in Figure 6 with their outer and inner walls out of engagement with the piston rod 8 of the wall of the cylinder.

Referring to Figures 7 to 12 inclusive the operation is as follows. Upon the downward movement of the piston 6 in cylinder 3, the intake valve 21 is opened as shown in Figure 7. At the same time the piston 7 moves downwardly under the influence of the explosion in the cylinder 4. The pistons 6 and 7 continue the downward movement, thereby compressing air beneath the same which has been previously admitted on the upward stroke through the valve closed ports closed by the air valves 31. After the pistons 6 and 7 have passed and uncovered the ports 37 at their upper ends, the compressed air escapes upwardly around the pistons 6 and 7, thereby volatilizing the charge previously sucked into the cylinder 3 and assisting in the exhaust of burnt gases from the cylinder 4 through the exhaust valve 38, as clearly shown in Figure 8. The pistons 6 and 7 then move upwardly and the piston 6 further compresses the charge in the cylinder 3, however during the upward movement of the pistons 6 and 7 the air valves 31 are unseated and air is sucked into the lower ends of both cylinders 3 and 4 pass the air valves 31 as shown in Figure 9. As the pistons 6 and 7 complete their upward stroke the compressed charge in the cylinder 3 is ignited as shown in Figure 10, and the air valves 31 are closed, and the pistons start on their downward stroke, at the same time the intake valve 21 in the cylinder 4 is opened thereby allowing a charge to be sucked into the cylinder 4 as shown in Figure 10. The pistons 6 and 7 continue their downward movement to the positions shown in Figure 11, at which time the ports 37 are uncovered and compressed air from beneath the piston 7 passes through the port 37 into the cylinder 4, thereby volatilizing and breaking up the charge in said cylinder 4. During this operation the gases within the cylinder 3 from the previous explosion checks the compressed air from passing through the port 37 of the cylinder 3 and through the exhaust port 38, and consequently the full force of the compressed air passes through the port 37 of the cylinder 4 to the charge which has been sucked into the same, as shown in Figure 11. As the pistons 6 and 7 again move upwardly, the piston 7 compresses the charge in the cylinder 4 and simultaneously open the air valves 31 for sucking in air beneath the pistons 6 and 7, cylinder 4 being fired on its upward stroke. The above cycles of operation continue in the same order.

From the above it will be seen that an internal combustion engine is provided which is positive in its operation, compact in construction, and one which obviates the use of connecting rods and complicated mechanisms. It is to be understood that any kind of lubricating means may be provided, a tank 39 is shown, which tank is provided with a feed pipe 40 and a vent pipe 41, which vent pipe will prevent the pistons from forcing the oil back into the oil tank 39. Any type of carbureter may be used and it may be if so desired connected to a throttle valve 42 in the air pipe 33 whereby they may be synchronized.

The invention having been set forth what is claimed as new and useful is:—

1. An internal combustion engine comprising parallel cylinders having their upper and lower ends closed by horizontally disposed walls, pistons disposed in said cylinders, said pistons being carried by piston rods extending through the lower ends of the cylinders, a port connecting the lower ends of the cylinders in the horizontal walls thereof and to one side of the piston rods, valve controlled means in the bottoms of the cylinders whereby air will be admitted below the pistons on their upward movement, intake and exhaust valves carried by the upper ends of the cylinders and ports in the walls of the cylinders whereby upon a downward movement of the pistons, air beneath the same will be compressed and discharged above the pistons when the pistons pass below the upper ends of the ports.

2. An internal combustion engine comprising spaced cylinders having their upper and lower ends closed, said ends being closed by horizontally disposed walls, intake and exhaust valves carried by the upper ends of the cylinders, air intake valves carried by the horizontal walls forming the lower ends of the cylinders, a port of communication between the lower ends of the cylinders, pistons disposed in the cylinders, piston rods carried by the pistons and extending through the bottom horizontal walls of the cylinders, and air ports in the walls of the cylinders in communication with the interior of the cylinders adjacent their lower ends and with the cylinders at points spaced from their lower ends and forming means for transferring compressed air from below the pistons to above the pistons.

In testimony whereof I have signed my name to this specification in the presence of two subscribing witnesses.

EMANUEL McINTOSH.

Witnesses:
 CLARENCE GRAYER,
 W. G. HENDERSON.